(12) United States Patent
Jeong et al.

(10) Patent No.: US 10,945,020 B2
(45) Date of Patent: Mar. 9, 2021

(54) ELECTRONIC APPARATUS AND METHOD OF OPERATING THE SAME

(71) Applicant: SAMSUNG ELECTRONICS CO., LTD., Suwon-si (KR)

(72) Inventors: Da-hee Jeong, Seoul (KR); Se-hyun Kim, Daejeon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/854,128

(22) Filed: Dec. 26, 2017

(65) Prior Publication Data
US 2018/0199094 A1 Jul. 12, 2018

(30) Foreign Application Priority Data

Jan. 12, 2017 (KR) .................. 10-2017-0005227

(51) Int. Cl.
*H04N 21/43* (2011.01)
*H04N 19/186* (2014.01)
*H04N 19/42* (2014.01)
(Continued)

(52) U.S. Cl.
CPC ........... *H04N 21/43* (2013.01); *H04N 19/186* (2014.11); *H04N 19/42* (2014.11);
(Continued)

(58) Field of Classification Search
None
See application file for complete search history.

(56) References Cited

U.S. PATENT DOCUMENTS 8,015,584 B2 * 9/2011 Breen ................ H04N 7/17318
725/86
2007/0192782 A1 8/2007 Ramaswamy
(Continued)

FOREIGN PATENT DOCUMENTS

EP         1 763 952 B1    11/2009
KR    10-2009-0106104 A    10/2009
KR    10-2012-0135856 A    12/2012

OTHER PUBLICATIONS

Search Report dated Apr. 13, 2018, issued by the International Searching Authority in counterpart International Application No. PCT/KR2017/014818 (PCT/ISA/210).
Communication dated Aug. 9, 2019, issued by the European Patent Office in counterpart European Application No. 17891557.5.

*Primary Examiner* — Samira Monshi
(74) *Attorney, Agent, or Firm* — Sughrue Mion, PLLC

(57) ABSTRACT

Provided are an electronic apparatus and a method of operating the same. The electronic apparatus includes: a buffer configured to receive one or more first frames corresponding to a first stream and one or more second frames corresponding to a second stream; and a controller configured to identify the one or more second frames and control the buffer to output the identified one or more second frames, in response to a playback switch event, wherein the controller is configured to identify the one or more second frames based on a time stamp value of the one or more second frames distinguished from a time stamp value of the one or more first frames or a second flag added to the one or more second frames and distinguished from a first flag added to the one or more first frames.

22 Claims, 8 Drawing Sheets

(51) Int. Cl.
*H04N 21/2343* (2011.01)
*H04N 21/44* (2011.01)
*H04N 21/2187* (2011.01)
*H04N 21/462* (2011.01)
*H04N 21/647* (2011.01)
*H04N 5/44* (2011.01)

(52) U.S. Cl.
CPC . *H04N 21/2187* (2013.01); *H04N 21/234309* (2013.01); *H04N 21/44004* (2013.01); *H04N 21/44008* (2013.01); *H04N 21/44016* (2013.01); *H04N 21/4622* (2013.01); *H04N 5/44* (2013.01); *H04N 21/64738* (2013.01); *H04N 21/64769* (2013.01)

(56) References Cited

U.S. PATENT DOCUMENTS

| | | |
|---|---|---|
| 2008/0109557 A1 | 5/2008 | Joshi et al. |
| 2009/0119151 A1* | 5/2009 | de Heer .......... H04N 21/25808 705/7.29 |
| 2009/0222873 A1 | 9/2009 | Einarsson |
| 2012/0117584 A1* | 5/2012 | Gordon ................ H04N 21/254 725/19 |
| 2014/0089962 A1* | 3/2014 | Ogawa ................ H04N 21/458 725/29 |
| 2015/0020094 A1 | 1/2015 | Moon et al. |
| 2016/0219309 A1 | 7/2016 | Lida |

* cited by examiner

ELECTRONIC APPARATUS AND METHOD OF OPERATING THE SAME

CROSS-REFERENCE TO RELATED APPLICATION

This application claims priority from Korean Patent Application No. 10-2017-0005227, filed on Jan. 12, 2017 in the Korean Intellectual Property Office, the disclosure of which is incorporated herein in its entirety by reference.

BACKGROUND

1. Field

Apparatuses and methods consistent with one or more exemplary embodiments relate to electronic apparatuses and methods of operating the same, and more particularly, to electronic apparatuses performing content playback switching and methods of operating the same.

2. Description of the Related Art

Since a smart or Internet-connected television (TV) may receive data from a data network such as an Internet network, viewers may receive digital broadcast content as well as multimedia content. As such, due to the increasing use of smart TVs or Internet-connected TVs and various smart devices, content providers may provide more abundant content, advertisements, and interactive content.

Smart TVs having significantly-improved data processing performance may increase and enrich user experiences by providing context-based content. In order to provide context-based content, a smart TV or a set-top box connected to the smart TV may recognize in real time what content is being displayed on a TV screen.

To achieve this, an automatic content recognition (ACR) technology is used to recognize content displayed on a TV. Two main technologies of the ACR technology are digital watermarking and content fingerprinting (digital fingerprinting). The digital watermarking is a method in which preprocessing is performed to embed watermark data in broadcast content prior to transmission of broadcast signals. Accordingly, a TV detects an embedded watermark to recognize the broadcast content. The content fingerprinting uses audio or video content fingerprinting to extract a fingerprint from content and match the same to a database (DB) to identify the content displayed on a TV. In a content fingerprinting method, a TV may continuously extract a fingerprint from content displayed on a TV display and transmit the extracted fingerprint to a fingerprint server operating a fingerprint DB. The fingerprint server may identify the content displayed on the TV by matching the fingerprint received from the TV to the fingerprint stored in the fingerprint DB. Also, the fingerprint server may provide information about the identified content to the TV.

Also, as customized ad services become more common with an increase in customized streaming services, a method of determining a time interval in which an advertisement is displayed between main images as an AD slot or a replacement slot and inserting an advertisement suitable for a user into the AD slot or the replacement slot may be implemented on a server side to provide customized advertisements for each client. Since this method may only have to provide each independent content, a content providing side may not utilize or require special skills or resources. Additionally, this method may be used by a service provider much more efficiently than a method of pre-encoding a main image and an advertisement.

Meanwhile, in a case where a display apparatus such as a TV receives and plays content from a plurality of sources, it may require a scheme for managing the content from the plurality of sources using the limited hardware resources of the display apparatus.

SUMMARY

Aspects of one or more exemplary embodiments provide electronic apparatuses capable of efficiently performing a switch of content to be played and methods of operating the same.

Additional aspects will be set forth in part in the description which follows and, in part, will be apparent from the description, or may be learned by practice of one or more exemplary embodiments.

According to an aspect of an exemplary embodiment, there is provided an electronic apparatus including: a first decoder configured to decode a first stream; a second decoder configured to decode a second stream; a buffer configured to receive one or more first frames corresponding to the decoded first stream from the first decoder and one or more second frames corresponding to the decoded second stream from the second decoder; and a controller configured to identify the one or more second frames stored in the buffer and control the buffer to output the identified one or more second frames, in response to a playback switch event for switching from the first stream to the second stream, wherein the controller is configured to identify the one or more second frames from the one or more first frames stored in the buffer based on a time stamp value of the one or more second frames distinguished from a time stamp value of the one or more first frames, and/or based on a second flag added by the second decoder to the one or more second frames and distinguished from a first flag added by the first decoder to the one or more first frames.

The controller may be configured to control the buffer to output the one or more second frames at a playback switch time obtained based on the playback switch event.

The playback switch time may include a time at which a time stamp value of a first frame, among the one or more first frames corresponding to the first stream, corresponds with time information obtained based on the playback switch event.

The first stream may correspond to digital television (TV) broadcasting content and the second stream may correspond to multimedia content.

The second stream requested for playback switch according to the playback switch event may include replacement content to be output in a replacement slot between currently-output content of the first stream and subsequent content of the first stream to be output after the currently-output content.

The controller may be configured to obtain, based on the playback switch event, information including at least one of a start point of the replacement slot, a length of the replacement slot, and source information of the replacement content to be output in the replacement slot.

The controller may be configured to control the buffer to transmit the one or more first frames stored in the buffer to an automatic content recognizer configured to extract a fingerprint from the one or more first frames.

The first decoder may be configured to provide the one or more first frames with the first flag added thereto to the buffer and the second decoder is configured to provide the one or more second frames with the second flag added thereto to the buffer.

The controller may be configured to: identify the one or more first frames stored in the buffer based on the time stamp value of the one or more first frames distinguished from the time stamp value of the one or more second frames, and/or based on the first flag added by the first decoder to the one or more first frames and distinguished from the second flag added by the second decoder to the one or more second frames; and control the buffer to output the identified one or more first frames, in response to a playback switch end time obtained based on the playback switch event.

According to an aspect of another exemplary embodiment, there is provided a method of operating an electronic apparatus, the method including: decoding, by a first decoder, a first stream; decoding, by a second decoder, a second stream; storing, in a buffer, one or more first frames corresponding to the decoded first stream from the first decoder and one or more second frames corresponding to the decoded second stream from the second decoder; and identifying the one or more second frames from the one or more first frames stored in the buffer and outputting the identified one or more second frames, in response to a playback switch event for switching from the first stream to the second stream, wherein the one or more second frames are identified based on a time stamp value of the one or more second frames distinguished from a time stamp value of the one or more first frames, and/or based on a second flag added by the second decoder to the one or more second frames and distinguished from a first flag added by the first decoder to the one or more first frames.

The method may further include controlling the buffer to output the one or more second frames at a playback switch time obtained based on the playback switch event.

The playback switch time may include a time at which a time stamp value of a first frame, among the one or more first frames corresponding to the first stream, corresponds with time information obtained based on the playback switch event.

The first stream may correspond to digital television (TV) broadcasting content and the second stream may correspond to multimedia content.

The second stream requested for playback switch according to the playback switch event may include replacement content to be output in a replacement slot between currently-output content of the first stream and subsequent content of the first stream to be output after the currently-output content.

The method may further include obtaining, according to the playback switch event, information including at least one of a start point of the replacement slot, a length of the replacement slot, and source information of the replacement content to be output in the replacement slot.

The method may further include controlling the buffer to transmit the one or more first frames stored in the buffer to an automatic content recognizer configured to extract a fingerprint from the one or more first frames.

The method may further include providing, by the first decoder to the buffer, the one or more first frames with the first flag added thereto and providing, by the second decoder to the buffer, the one or more second frames with the second flag added thereto.

The method may further include identifying the one or more first frames stored in the buffer based on the time stamp value of the one or more first frames distinguished from the time stamp value of the one or more second frames, and/or based on the first flag added by the first decoder to the one or more first frames and distinguished from the second flag added by the second decoder to the one or more second frames.

The method may further include: transmitting, to an external device, a fingerprint extracted from at least one first frame, among the one or more first frames; and receiving, from the external device in response to the transmitted fingerprint, information corresponding to the playback switch event and including at least one of a start point of the replacement slot, a length of the replacement slot, and source information of the replacement content to be output in the replacement slot.

According to an aspect of another exemplary embodiment, there is provided a non-transitory computer-readable recording medium that stores a program that performs the method when executed by a computer.

According to an aspect of another exemplary embodiment, there is provided an electronic apparatus including: a buffer configured to store one or more first frames corresponding to a first stream and one or more second frames corresponding to a second stream; and a controller configured to identify the one or more second frames stored in the buffer and control the buffer to output the identified one or more second frames, in response to a playback switch event for switching from the first stream to the second stream, wherein the controller is configured to identify the one or more second frames from the one or more first frames stored in the buffer based on a time stamp value of the one or more second frames distinguished from a time stamp value of the one or more first frames, and/or based on a second flag added by the electronic apparatus to the one or more second frames and distinguished from a first flag added by the electronic apparatus to the one or more first frames.

The controller may be configured to control the buffer to transmit the one or more first frames to an automatic content recognizer configured to extract a fingerprint from the one or more first frames.

The second stream requested for playback switch according to the playback switch event may include replacement content to be output in a replacement slot between currently-output content of the first stream and subsequent content of the first stream to be output after the currently-output content.

The controller may be configured to control to transmit, to an external device, a fingerprint extracted from at least one of the one or more first frames, and to receive, from the external device, information corresponding to the playback switch event and including at least one of a start point of the replacement slot, a length of the replacement slot, and source information of the replacement content to be output in the replacement slot.

The controller may be configured to control the buffer to output the one or more second frames at a playback switch time obtained based on the received information corresponding to the playback switch event.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1:
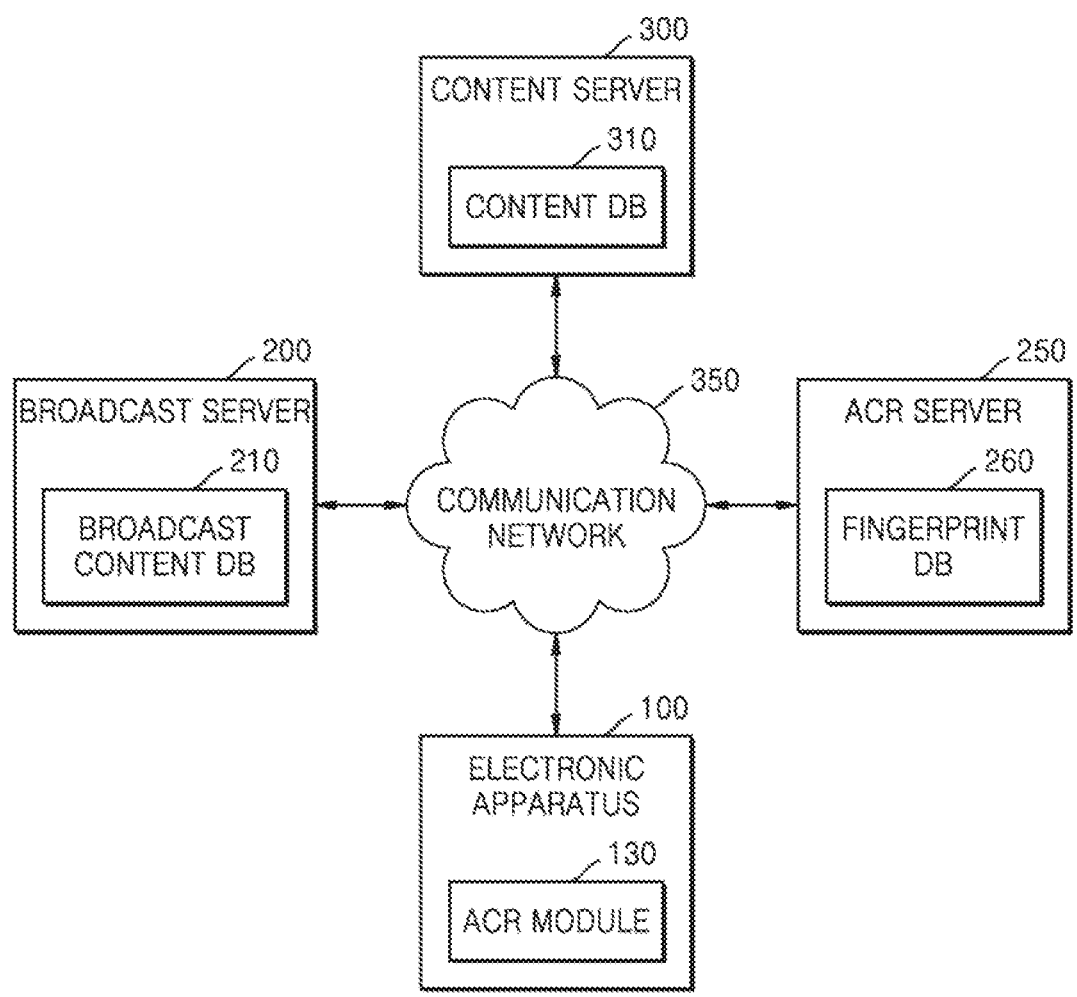
FIG. 1 is a schematic diagram of a network system applied to one or more exemplary embodiments.

Reference will now be made in detail to exemplary embodiments, examples of which are illustrated in the accompanying drawings, wherein like reference numerals refer to like elements throughout. In this regard, exemplary embodiments may have different forms and should not be construed as being limited to the descriptions set forth herein. Accordingly, one or more exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The terms used in the specification will be briefly described, and exemplary embodiments of inventive concept(s) will be described in detail.

The terms used in the specification are those general terms currently widely used in the art in consideration of functions in regard to exemplary embodiments, but the terms may vary according to the intentions of those of ordinary skill in the art, precedents, or new technology in the art. Also, in some cases, there may be terms that are optionally selected by the applicant, and the meanings thereof will be described in detail in the corresponding portions of the description of exemplary embodiments. Thus, the terms used herein should be understood not as simple names but based on the meanings of the terms and the overall description of exemplary embodiments.

Throughout the specification, when something is referred to as "including" a component, another component may be further included unless specified otherwise. Also, the terms "units" and "modules" used herein may refer to units that perform at least one function or operation, and the units may be implemented as hardware (e.g., circuitry, one or more processors, etc.) or software or a combination of hardware and software.

Hereinafter, exemplary embodiments will be described in detail with reference to the accompanying drawings so that those of ordinary skill in the art may easily implement inventive concept(s). However, exemplary embodiments may have different forms and should not be construed as being limited to the descriptions set forth herein.

As used herein, the term "user" may refer to a person controlling a function or operation of an image display apparatus by using a control apparatus and may include a viewer, a manager, or an installer.

FIG. 1 is a schematic diagram of a network system applied to one or more exemplary embodiments.

Referring to FIG. 1, a network system according to an exemplary embodiment may include an electronic apparatus 100, a broadcast server 200, an automatic content recognition (ACR) server 250, a content server 300, and a communication network 350.

The broadcast server 200 may provide (or broadcast) broadcast content stored in a broadcast content database (DB) 210 to the electronic apparatus 100 through the communication network 350.

The content server 300 may provide the content stored in a content DB 310 to the electronic apparatus 100 through the communication network 350.

A network provider such as the broadcast server 200 or the content server 300 may include suitable logics, circuits, processors, interfaces, and/or codes that may be operated to generate, acquire, or package content such as multimedia content or television (TV) programs to be distributed to the electronic apparatus 100 such as an ACR-based device. Also, the network provider may provide content to the ACR server 250 in order to support an ACR operation.

The electronic apparatus 100 may receive the broadcast content from the broadcast server 200 and display the received broadcast content, and/or may receive the content from the content server 300 and display the received content.

The electronic apparatus 100 may include suitable logics, circuits, processors, interfaces, and/or codes that may be operated to receive content and provide the content to a viewer. The electronic apparatus 100 may include an ACR module 130. The ACR module 130 (e.g., ACR device, ACR logic, ACR circuitry, automatic content recognizer, etc.) may include suitable logics, circuits, interfaces, processors, and/or codes that may be operated to provide an ACR function for the electronic apparatus 100.

The electronic apparatus 100 may extract fingerprints by sampling the content displayed on a screen at a given (e.g., predetermined or set) rate and transmit the extracted fingerprints to the ACR server 250 at a certain (e.g., predetermined or set) rate. For example, the ACR module 130 of the electronic apparatus 100 may extract fingerprints by sampling the content displayed on the screen at a rate of ten times per second and transmit the extracted fingerprints to the ACR server 250 at a rate of ten fingerprints per second.

The electronic apparatus 100 may be connected to a set-top box. The set-top box may include suitable logics, circuits, processors, interfaces, and/or codes that may be operated to connect the electronic apparatus 100 such as an ACR-based device to an external source and convert the signal received from the external source into the content that may be displayed on the screen of the electronic apparatus 100.

The electronic apparatus 100 may include a display apparatus mounted with the ACR module 130, a settop connected to the display apparatus, and a paring apparatus paired to the display apparatus. However, it is understood that one or more other exemplary embodiments are not limited to an electronic apparatus 100 including a display apparatus, and may be applied to a processing apparatus (e.g., an image processing apparatus such as an audio/visual receiver, an optical recording media player, a set-top box, etc.) that outputs an image to an external display apparatus (such as an external screen or monitor).

The ACR server 250 may include suitable logics, circuits, processors, interfaces, and/or codes that may be operated to support an ACR operation in the electronic apparatus 100. The ACR server 250 may provide ACR applications and/or services to the electronic apparatus 100. The ACR server 250 may provide one or more ACR technologies and may also provide synchronization with the electronic apparatus 100. The ACR server 250 may support a plurality of different fingerprint technologies (or watermarking technologies) for automatic content recognition (ACR).

The ACR server 250 may include a fingerprint DB 260. When receiving a fingerprint from the electronic apparatus 100, by analyzing or comparing the received fingerprint based on the fingerprint DB 260, the ACR server 250 may acquire or obtain information about a replacement slot between subsequent content and content displayed on the electronic apparatus 100 and transmit the information about the replacement slot to the electronic apparatus 100.

The ACR server 250 may determine information corresponding to the content displayed on the electronic apparatus 100 by matching the fingerprint received from the electronic apparatus 100 with a fingerprint stored in the fingerprint DB 260. The information corresponding to the content may include information about a replacement slot between content (e.g., current content) displayed on the electronic apparatus 100 and subsequent content to be displayed subsequent to the content (e.g., current content). The information about the replacement slot may include at least one of a start point of the replacement slot representing a display time of replacement content, a length of the replacement slot, and address information of the replacement content to be displayed in the replacement slot. The ACR server 250 may simultaneously or sequentially transmit the determined information about the replacement slot to the electronic apparatus 100.

The fingerprint DB 260 may include suitable logics, circuits, processors, interfaces, and/or codes that may be operated to store the fingerprint acquired or obtained from a fingerprint providing server and maintain the correlation between the acquired fingerprint and the content identification information/media time.

The communication network 350 may include suitable logics, circuits, processors, interfaces, and/or codes that may be operated to provide communication between a plurality of entities through various wired or wireless technologies. The wired or wireless technologies may include T1/E1, digital subscriber line (DSL), cable modem, Fiber to the x (FTTx), power-line communication (PLC), WiMax, IEEE 802.11, Wi-Fi, etc. The communication network 350 may include an Internet or multimedia network.

Meanwhile, the electronic apparatus 100 according to an exemplary embodiment may be a TV. However, this is merely an exemplary embodiment and one or more other exemplary embodiments are not limited thereto and may be implemented as any electronic apparatus including a display. For example, the electronic apparatus 100 may be implemented as various electronic apparatuses such as portable phones, tablet personal computers (PCs), digital cameras, camcorders, notebook computers (laptop computers), desktops, e-book terminals, digital broadcast terminals, personal digital assistants (PDAs), portable multimedia players (PMPs), navigation devices, MP3 players, wearable devices, etc.

The electronic apparatus 100 may be controlled by a control apparatus, and the control apparatus may be implemented as various types of apparatuses such as remote controls or portable phones for controlling the electronic apparatus 100. Also, the control apparatus may control the electronic apparatus 100 by using near field communication (NFC), Infrared, Bluetooth, or other short-range wireless communications.

In the system illustrated in FIG. 1, since the electronic apparatus 100 may receive and play content from a plurality of sources, that is, broadcast content from the broadcast server 200 and multimedia content from the content server 300, the electronic apparatus 100 may require a content switch when receiving a content playback request from another source (e.g., second source) while playing content from a source (e.g., first source). Also, for example, when receiving the information about the replacement slot from the ACR server 250 while playing the broadcast content from the broadcast server 200, the electronic apparatus 100 may require a switch to the replacement content to be displayed in the replacement slot. A method of efficiently managing a switch of playback content in the electronic apparatus 100 according to an exemplary embodiment will be described below.

Figure 2:
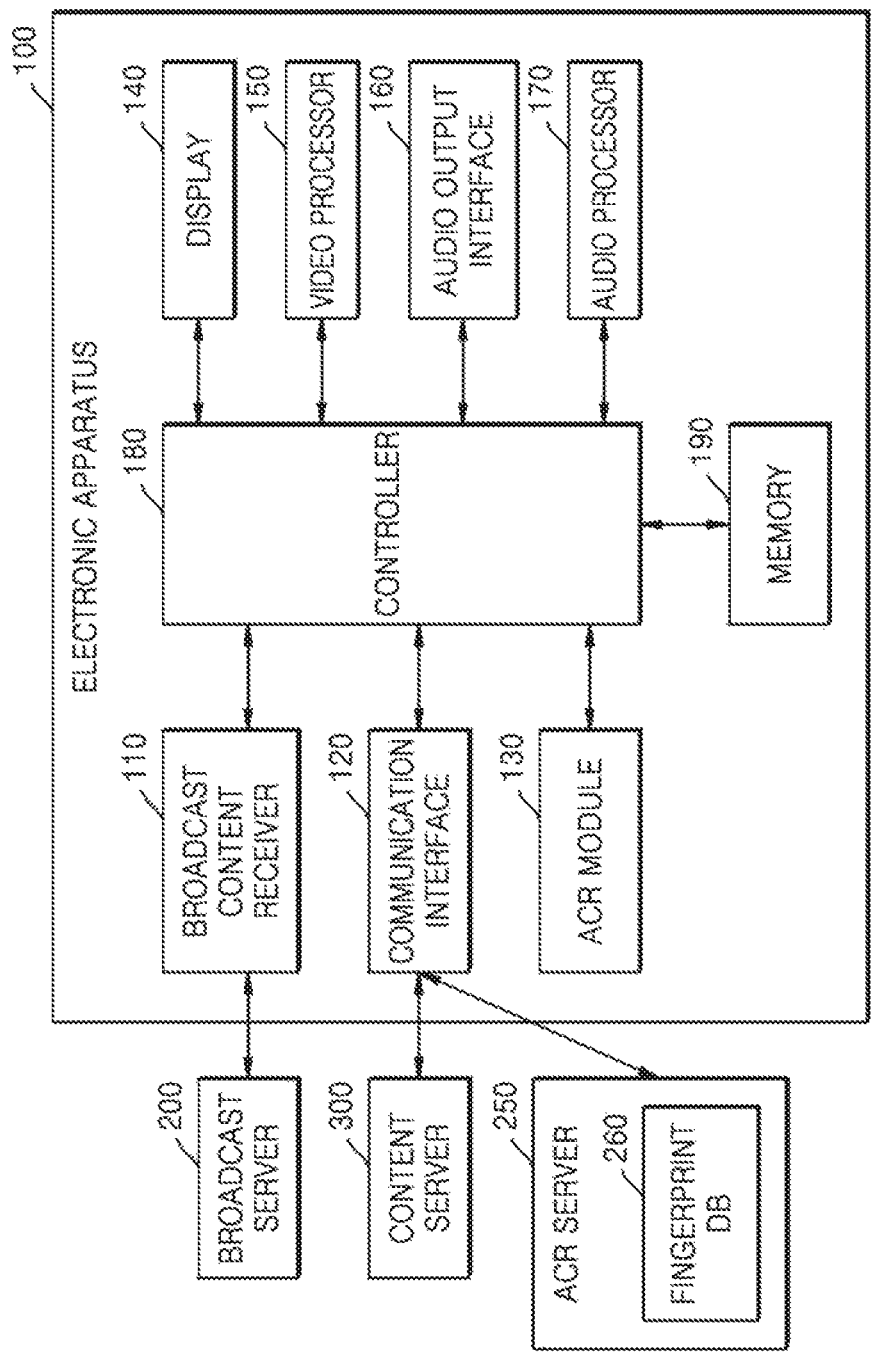
FIG. 2 is a schematic block diagram of an electronic apparatus according to an exemplary embodiment.

FIG. 2 is a schematic block diagram of an electronic apparatus 100 according to an exemplary embodiment.

Referring to FIG. 2, the electronic apparatus 100 may include a broadcast content receiver 110, a communication interface 120, an ACR module 130 (e.g., ACR device, ACR logic, ACR circuitry, automatic content recognizer, etc.), a display 140, a video processor 150, an audio output interface 160, an audio processor 170, and a controller 180.

The broadcast content receiver 110 may receive broadcast content from the broadcast server 200.

The broadcast content receiver 110 may include, for example, a tuner. The tuner may process a broadcast signal, which is received in a wired or wireless manner, through amplification, mixing, and/or resonance. Additionally, the tuner may tune and select only a frequency of a channel, which is to be received by the electronic apparatus 100, among a plurality of received wave components of broadcast signals. The broadcast signal may include audio, video, and additional information (e.g., electronic program guide (EPG)). The tuner may receive broadcast signals from various sources such as terrestrial broadcasting, cable broadcasting, satellite broadcasting, and Internet broadcasting. The tuner may receive a broadcast signal from a source such as an analog broadcasting source or a digital broadcasting source.

Also, the broadcast content receiver 110 may divide and/or demultiplex a received audio/video stream (e.g., an MPEG audio/video multiplexed bitstream) into an audio bitstream and a video bitstream and output the audio bitstream and the video bitstream respectively to the audio processor 170 and the video processor 150 for decoding.

The communication interface 120 may receive multimedia content from the content server 300. Also, the communication interface 120 may communicate with the ACR server 250.

According to an exemplary embodiment, under the control of the ACR module 130, the communication interface 120 may periodically transmit content recognition information used to recognize content displayed on the display 140, for example, a fingerprint corresponding to the content, to the ACR server 250.

According to an exemplary embodiment, the communication interface 120 may periodically receive information about a replacement slot from the ACR server 250 and provide the received information (or information based thereon) to the ACR module 130. The information about the replacement slot may include a start point of the replacement slot representing a display time of replacement content, a length of the replacement slot, and/or address information of the replacement content to be displayed in the replacement slot.

The ACR module 130 may include suitable logics, circuits, processors, interfaces, and/or codes that may be operated to provide an ACR function for the electronic apparatus 100. The ACR module 130 may communicate with the ACR server 250 through a communication network in order to support an ACR operation of the electronic apparatus 100.

The ACR module 130 may periodically provide a fingerprint to the ACR server 250 for recognition of content displayed on the display 140. The ACR module 130 may receive ACR-related information or content from the ACR server 250. The ACR module 130 may operate to execute a synchronization event manager to monitor an event occurring inside (internal event) or outside (external event) the electronic apparatus 100. The synchronization event manager may be executed as a background process in order to be continuously executed during the period of monitoring. An external event may include an event corresponding to ACR matching. An internal event may include a process, an application, and/or a function corresponding to ACR performed by the electronic apparatus 100. In response to the detection of an event trigger, the synchronization event manager may request or receive a suitable application. The synchronization event manager may be implemented as at least one of hardware, software, and firmware.

The ACR module 130 may use the ACR server 250 to identify viewer interaction or viewer information related to the electronic apparatus 100 and may allow the ACR server 250 to diversify and provide an advertisement to be displayed in a replacement slot based on the identified viewer information or viewer interaction. The replacement slot may represent a time interval between content displayed on a display (e.g., current content) and subsequent content subsequent to the displayed content, may refer to an interval in which replacement content may be displayed, and/or may include a commercial break during the display of content or a next AD spot. The replacement content that may be displayed in the replacement slot is not limited and may include any type of content. An example of the replacement content may be advertisement content.

According to an exemplary embodiment, the ACR module 130 may monitor content displayed on the display 140, periodically acquire a fingerprint from the displayed content, and transmit the acquired fingerprint to the ACR server 250.

According to an exemplary embodiment, the ACR module 130 may receive information about the replacement slot from the ACR server 250. The information about the replacement slot may include a start point of the replacement slot representing a display time of replacement content, a length of the replacement slot, and/or address information of the replacement content to be displayed in the replacement slot.

According to an exemplary embodiment, the ACR module 130 may use the address information of the replacement content to access the replacement content in order to receive the replacement content before or simultaneously with the arrival of the start point of the replacement slot. The address information of the replacement content may include, for example, URL information of the replacement content.

According to an exemplary embodiment, the ACR module 130 may generate a playback switch event for requesting a switch of a playback stream and transmit the same to the video processor 150. According to an exemplary embodiment, the playback switch event may include a command to display the replacement content in the replacement slot. In this case, the playback switch event may include a start point of the replacement slot, a length of the replacement slot, and/or a source of the replacement slot.

The display 140 may generate a driving signal by converting an image signal, a data signal, an on-screen display (OSD) signal, and/or a control signal processed by the video processor 150. The display 140 may be implemented as a plasma display panel (PDP), an liquid crystal display (LCD) panel, an organic light emitting diode (OLED) display, an active matrix OLED (AMOLED) display, a digital light processing (DLP) display, a light emitting diode (LED) display, a cathode ray tube (CRT) display, a flexible display, etc., and may also be implemented as a three-dimensional (3D) display. Also, the display 140 may be configured as a touch screen to be used as an input apparatus in addition to an output apparatus.

The video processor 150 may signal-process an image to be displayed by the display 140 and perform various image processings such as at least one of decoding, scaling, noise filtering, frame rate conversion, resolution conversion, etc., on video data.

According to an exemplary embodiment, the video processor 150 may receive a playback switch event and control a playback switch of a plurality of streams in response to the playback switch event. The video processor 150 may receive a playback switch event from the controller 180 or the ACR module 130.

The playback switch event may include, for example, a request for a playback switch from a first stream to a second stream. For example, the first stream may include live content and the second stream may include multimedia content. The playback switch event may include playback switch time information, length information of the time of displaying a playback-switched stream, and/or source information of the playback-switched stream.

According to an exemplary embodiment, the playback switch event received from the ACR module 130 may include a command to display the replacement content in the replacement slot. In this case, the playback switch event may include a start point of the replacement slot, a length of the replacement slot, and/or a source of the replacement slot.

According to an exemplary embodiment, in response to the playback switch event, the video processor 150 may identify or distinguish the second stream from the first stream and output the identified second stream. The video processor 150 may use time information, that is, time stamp information or a flag, to identify the second stream from the first stream. This will be described in detail with reference to FIGS. 3 to 8.

The audio output interface 160 may output an audio signal processed by the audio processor 170.

The audio output interface 160 may include at least one or a combination of a speaker, a headphone output port, a Sony/Philips Digital Interface (S/PDIF) output port, a High-Definition Multimedia Interface (HDMI) port, one or more component interfaces, a digital audio port, an optical audio port, a wireless interface (e.g., Bluetooth transceiver), etc.

The audio processor 170 may process an audio signal to be output by the audio output interface 160.

The audio processor 170 may perform processing on audio data. The audio processor 170 may perform various processings such as at least one of decoding, amplification, noise filtering, etc., on the audio data. Meanwhile, the audio processor 170 may include a plurality of audio processing modules (e.g. at least one of hardware (such as circuitry) and software) for processing the respective audio corresponding to a plurality of contents.

According to an exemplary embodiment, the audio processor 170 may receive a playback switch event from the ACR module 130 and control a playback switch of a plurality of streams in response to the playback switch event. A method of controlling a playback switch by the audio processor 170 may be performed in the same or similar manner as the method performed in the video processor 150 described above.

The controller 180 may control an overall operation of the electronic apparatus 100 and a signal flow between the internal components of the electronic apparatus 100 and may perform a data processing function. When there is a user's input or a preset stored condition is satisfied, the controller 180 may execute various applications and an operation system (OS) stored in the memory 190.

The controller 180 may include a processor, a read only memory (ROM) that stores a control program for controlling the electronic apparatus 100, and a random-access memory (RAM) that stores a signal or data input from outside the electronic apparatus 100 and/or is used as a storage region corresponding to various operations performed by the electronic apparatus 100.

Although it has been described above that an ACR-related operation is performed by the ACR module 130, some or all operations or functions of the ACR module 130 may also be performed by the controller 180 in one or more other exemplary embodiments.

The memory 190 may include or store an operating system, data processed in the controller 180, and/or one or more instructions executed in the controller 180.

In particular, the memory 190 according to an exemplary embodiment may include one or more instructions performed by the ACR module 130 and one or more instructions performed by the video processor 150.

In an exemplary embodiment, the term "memory" may include a storage; a RAM or a ROM of a controller; and/or a memory card (e.g., a secure digital (SD) or micro SD card or a universal serial bus (USB) memory) installed or provided in the electronic apparatus 100. Also, the memory 190 may include a nonvolatile memory, a volatile memory, a hard disk drive (HDD), or a solid state drive (SSD).

In addition to the configuration illustrated in FIG. 2, the electronic apparatus 100 may further include an input/output interface configured to receive video data, audio data, and additional information from outside the electronic apparatus 100 and/or a sensor configured to sense or capture a user's image or a user's interaction.

Also, the electronic apparatus 100 is not limited and may be any electronic apparatus such as a laptop, a smart phone, a tablet, a wearable apparatus, or a personal digital assistant (PDA) that may execute an application by including a processor and a memory. Additionally, as noted above, the electronic apparatus 100 may be a device that does not include a display, but outputs image data to another device.

Meanwhile, each component of the block diagram of the electronic apparatus 100 illustrated in FIG. 2 may be integrated, added, or omitted according to the specifications of the electronic apparatus 100 that are actually implemented. That is, if necessary, desired, or so designed, two or more components may be combined into one component, or one component may be divided into two or more components. Also, a function or an operation performed in each block is to set forth to describe one or more exemplary embodiments, and a particular operation or device thereof is not intended to limit the scope of the inventive concept(s).

Figure 3:
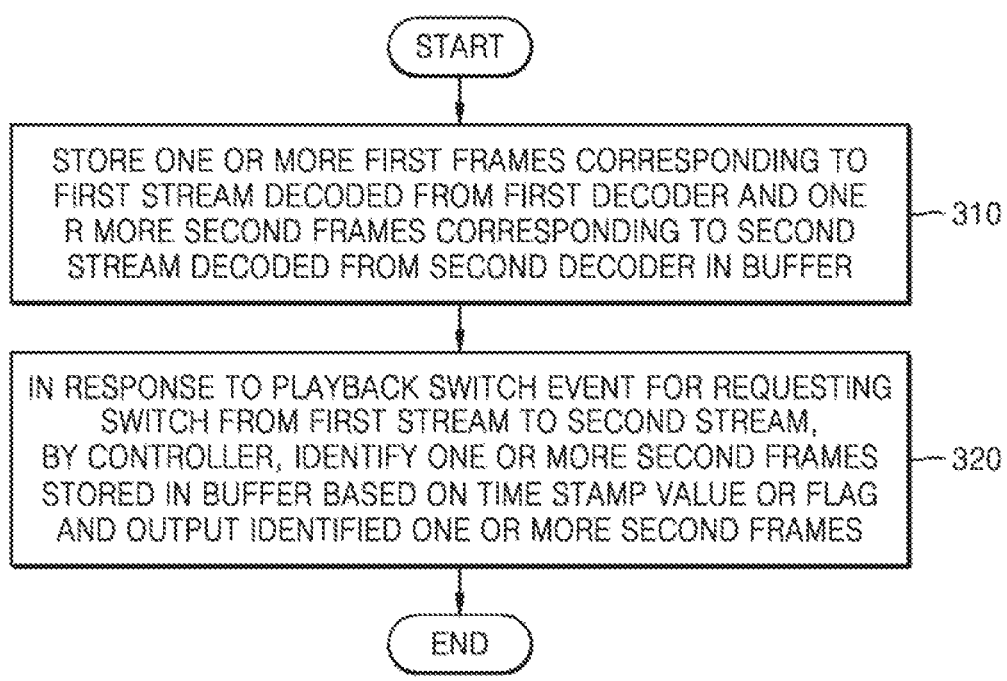
FIG. 3 is a flow diagram illustrating operations in an electronic apparatus according to an exemplary embodiment.

FIG. 3 is a flow diagram illustrating operations in an electronic apparatus 100 according to an exemplary embodiment.

Referring to FIG. 3, in operation 310, the electronic apparatus 100 may store one or more first frames corresponding to a first stream decoded from a first decoder and one or more second frames corresponding to a second stream decoded from a second decoder in a buffer (e.g., in a first buffer and a second buffer, respectively).

In operation 320, in response to a playback switch event for requesting a switch from the first stream to the second stream, the electronic apparatus 100 may identify one or more second frames stored in the buffer (e.g., the second buffer) from one or more first frames based on a time stamp value or a flag and output the identified one or more second frames to an image output unit such as a display. The operations illustrated in FIG. 3 will be described in detail with reference to a detailed configuration of the video processor 150 illustrated in FIG. 4.

Figure 4:
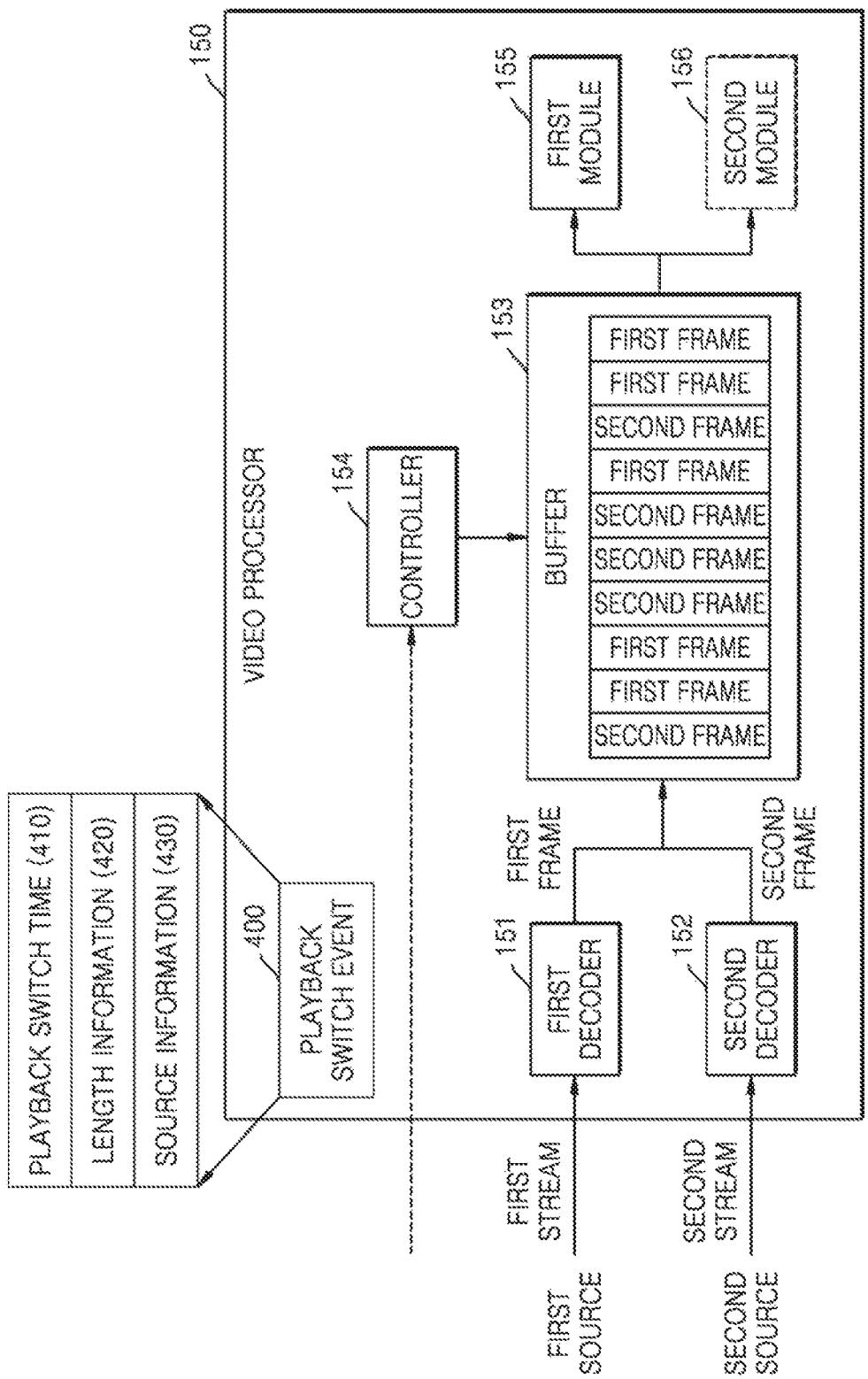
FIG. 4 illustrates a detailed configuration of a video processor illustrated in FIG. 2.

FIG. 4 illustrates a detailed configuration of the video processor 150 illustrated in FIG. 2, according to an exemplary embodiment.

Referring to FIG. 4, the video processor 150 may include a first decoder 151, a second decoder 152, a buffer 153, a controller 154, a first module 155, and a second module 156.

The first decoder 151 may decode a first stream received from a first source and transmit one or more decoded first frames to the buffer 153. The first stream received from the first source may include, for example, a broadcast content stream received from the broadcast content receiver 110.

The second decoder 152 may decode a second stream received from a second source and transmit one or more decoded second frames to the buffer 153. The second stream received from the second source may include, for example, a multimedia content stream received from the communication interface 120.

The buffer 153 may receive decoded data from at least one of the first decoder 151 and the second decoder 152 in units of frames and transmit received frames to the first module 155 or the second module 156 under the control of the controller 154.

Until the execution of a playback switch event, one or more first frames from the first decoder 151 may be output to the first module 155 such that the first stream corresponding to the first frame may be displayed on a screen of the electronic apparatus 100.

According to an exemplary embodiment, while receiving and storing the one or more decoded first frames corresponding to the first stream from the first decoder 151, the buffer 153 may receive and store the one or more decoded second frames corresponding to the second stream from the second decoder 152 in response to a playback switch event for requesting a playback switch from the first stream to the second stream. Since the buffer 153 continues to receive the one or more decoded first frames from the first decoder 151, the decoded one or more first frames and the decoded one or more second frames may be stored together in the buffer 153.

The controller 154 may receive a playback switch event 400 for requesting a switch from the first stream to the second stream from the controller 180 or the ACR module 130. The playback switch event 400 may include at least one of a time 410 of a playback switch from the first stream to the second stream, length information 420 of the time of playing the playback-switched second stream, and source information 430 of the second stream to be playback-switched.

In response to the received playback switch event, the controller 154 may identify or distinguish one or more second frames from one or more first frames stored in the buffer 153 and control the buffer 153 to output the identified one or more second frames to the first module 155.

According to an exemplary embodiment, the controller 154 may identify or distinguish the second frame from the first frame based on a time stamp value of the second frame distinguished from a time stamp value of the first frame and/or a second flag added to the second frame by the second decoder 152 and distinguished from a first flag added to the first frame by the first decoder 151. According to another exemplary embodiments, the one or more first frames and the one or more second frames may respectively be stored in different physical or logical regions of the buffer 153, or may respectively be stored in a first buffer and a second buffer.

According to an exemplary embodiment, the controller 154 may control the buffer 153 to output the one or more second frames at a playback switch time determined according to the playback switch event.

According to an exemplary embodiment, the playback switch time may include a time at which a time stamp value of the first frame corresponding to the first stream corresponds with time stamp time information included in the playback switch event.

According to an exemplary embodiment, the second stream requested for playback switch according to the playback switch event may include replacement content to be displayed in a replacement slot.

According to an exemplary embodiment, the playback switch event may include at least one of a start point of the replacement slot, a length of the replacement slot, and source information of the replacement content to be displayed in the replacement slot.

According to an exemplary embodiment, during the playback switch from the first stream to the second stream, the controller 154 may transmit or control to transmit the one or more second frames stored in the buffer 153 to the first module 155 and transmit or control to transmit one or more first frames to the second module 156.

According to an exemplary embodiment, in response to a playback switch end time, in order to end the play of the second stream, the controller 154 may identify or distinguish the one or more first frames from the one or more second frames stored in the buffer 153 and control the buffer 153 to output the identified one or more first frames to the first module 155.

The first module 155 may include, for example, a video scaler configured to scale the frame received from the buffer 153. Alternatively (or additionally), the first module 155 may include an image output unit including a scaler.

The second module 156 may be a module configured to extract information by using the frame received from the buffer 153. The second module 156 may be, for example, an ACR module 130 configured to extract a fingerprint. The second module 156 may be located inside or outside the video processor 150.

A method of identifying a frame by using a time stamp will now be described with reference to FIGS. 5 and 6.

Figure 5:
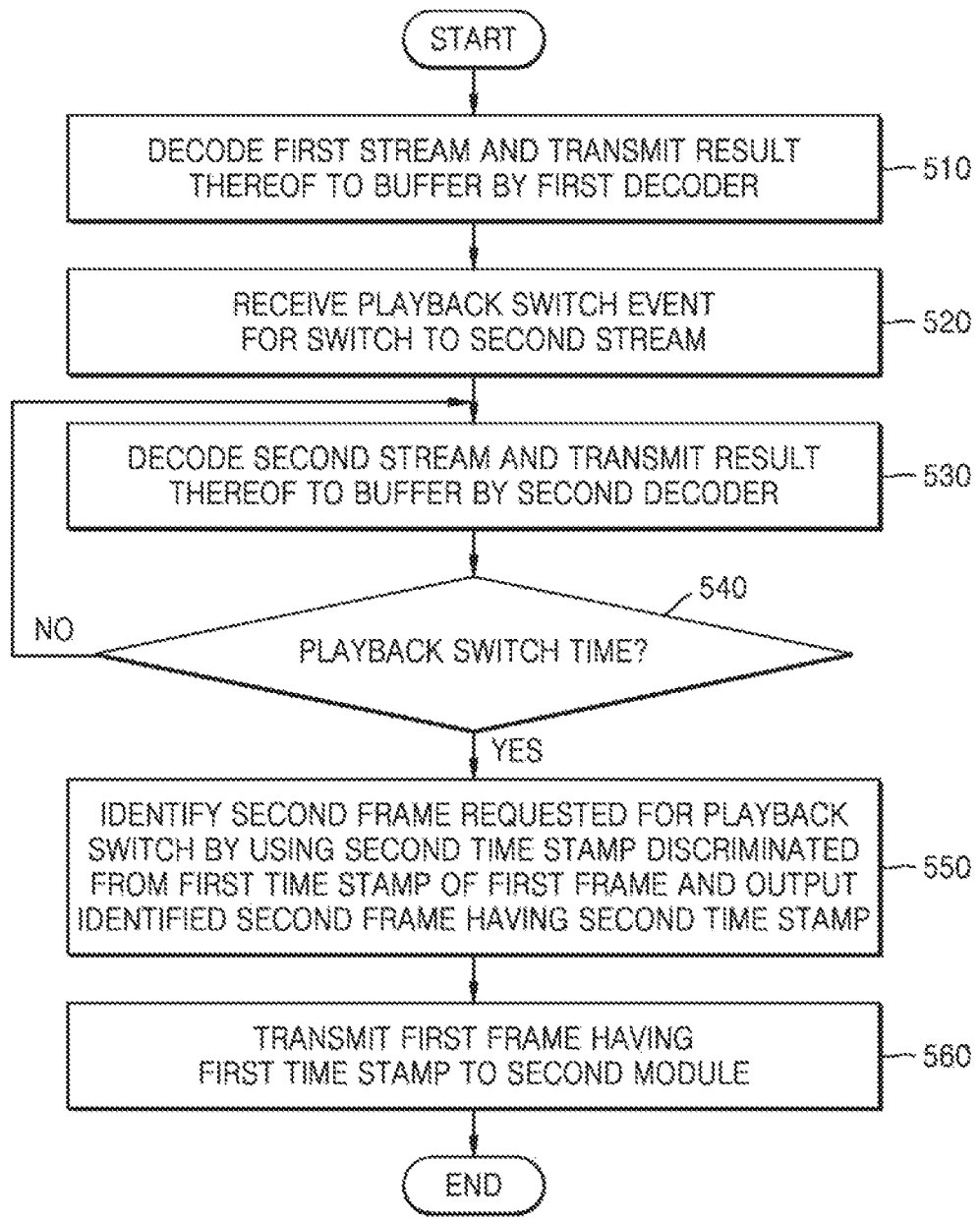
FIG. 5 is a flow diagram illustrating a process of a method of identifying a frame by using a time stamp according to an exemplary embodiment.

FIG. 5 is a flow diagram illustrating a process of a method of identifying a frame by using a time stamp according to an exemplary embodiment.

Figure 6:
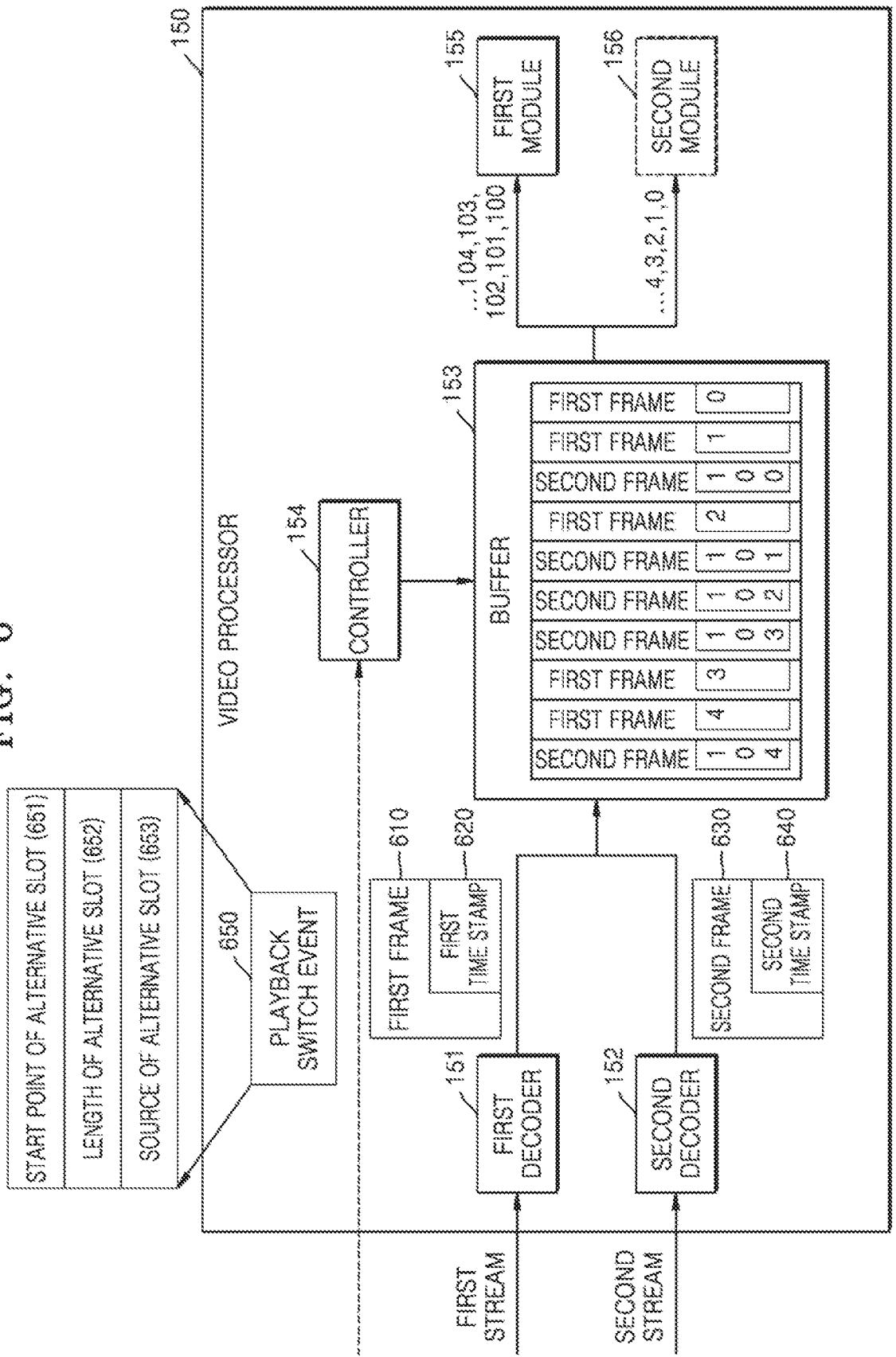
FIG. 6 is a reference diagram illustrating the method illustrated in FIG. 5.

FIG. 6 is a reference diagram illustrating the method illustrated in FIG. 5.

Referring to FIG. 5, in operation 510, the first decoder 151 may decode the first stream and transmit a result thereof (e.g., one or more decoded first frames) to the buffer 153.

A video decoder receiving and processing a stream (e.g., an MPEG stream or an HEVC stream) used to transmit broadcast content may remove overhead data such as start codes or various header information from an input video bitstream, decode pure data information, restore pixel values of an original screen, and/or output the same to a monitor.

In a video bitstream, a system time clock (STC), a decoding time stamp indicating when each frame will be decoded, and a presentation time stamp indicating when the restored data will be displayed may be multiplexed. Since the decoding time stamp or the presentation time stamp is unique for each stream from each source, it may be used to identify a bitstream from a source (e.g., first source) and a bitstream from another source (e.g., second source).

Referring to FIG. 6, the first decoder 151 may receive and decode, for example, a live content stream as a first stream and transmit one or more first frames 610 corresponding to the decoded first stream to the buffer 153. The buffer 153 may store the one or more first frames 610 received from the first decoder 151 until the one or more first frames 610 are to be output. The one or more first frames 610 may each include a first time stamp corresponding to the first stream.

Until the execution of a playback switch event, one or more first frames 610 from the first decoder 151 may be output to the first module 155 such that the first stream (e.g., broadcast content) corresponding to the one or more first frames 610 may be displayed on a screen of the electronic apparatus 100.

In operation 520, the controller 154 may receive a playback switch event 650 for requesting a playback switch from the first stream to the second stream. The first stream and the second stream may be any streams from different sources. For example, in the following description, it is assumed that the first stream is a live content stream and the second stream is multimedia content (e.g., Internet-or network-streaming or stored content, advertisement content, etc.).

As an example, the controller 154 may receive the playback switch event 650 from the ACR module 130. The playback switch event 650 received from the ACR module 130 may be an event for requesting a playback switch from the live content stream to the multimedia content in order to display the replacement content in a replacement slot. The replacement slot may represent a time interval in which a content playback is switched.

The playback switch event 650 may include a start point 651 of the replacement slot, a length 652 of the replacement slot, and a source 653 of the replacement slot. The start point 651 of the replacement slot may represent a point at which the replacement content starts to be displayed in the replacement slot, that is, a point (e.g., time point or time interval) of the switch from the live content stream that is the first stream to the multimedia content that is the second stream. The length 652 of the replacement slot may represent a length of the time of displaying the replacement content. An end point of the replacement slot, that is, a point at which the display of the multimedia content that is the replacement content is ended and then the playback is again switched to the live content stream may be determined by the length 652 of the replacement slot. The source 653 of the replacement slot may represent a source of the replacement content to be displayed in the replacement slot. The source 653 of the replacement slot may indicate that the replacement content to be displayed in the replacement slot is, for example, the multimedia content received from the second decoder 152.

In operation 530, the second decoder 152 may decode the second stream and transmit a result thereof to the buffer 153.

According to a playback switch event, the second decoder 152 may receive and decode the second stream, e.g., the multimedia content stream, and transmit one or more second frames 630 corresponding to the decoded second stream to the buffer 153. As an example, when receiving the playback switch event 650 for requesting a playback switch from the first stream to the second stream, as a preparation for the playback switch to the second stream, the controller 154 may allow the buffer 153 to receive a second frame 630 from the second decoder 152. Since the buffer 153 continues to receive the first frame 610 from the first decoder 151, the buffer 153 may store a mixture or combination of one or more first frames 610 from the first decoder 151 and one or more second frames 630 from the second decoder 152. For example, by receiving and storing some first frames 610 from the first decoder 151 and then receiving and storing some second frames 630 from the second decoder 152, the buffer 153 may accumulate the frames received from the first decoder 151 and the second decoder 152, in an order of receiving the frames, without a predetermined order. Thus, the one or more first frames from the first decoder 151 and the one or more second frames from the second decoder 152 may be mixed in the buffer 153 without a predetermined order or in an arbitrary manner.

In operation 540, the controller 154 may determine whether a playback switch time has arrived.

For example, by using the start point 651 of the replacement slot included in the playback switch event 650, the controller 154 may determine whether the playback switch time has arrived. The start point 651 of the replacement slot may be represented as a predetermined time stamp value of the first stream. For example, when the start point 651 of the replacement slot represents a time stamp value <7> of the first stream, the controller 154 may output only up to the first frame having a time stamp value <7> among the one or more first frames corresponding to the first stream and determine a subsequent time as a playback switch time to the second stream.

When the playback switch time has not arrived, the first decoder 151 and the second decoder 152 may continue to perform a process of decoding the first stream and transmitting a result thereof to the buffer 153 and decoding the second stream and transmitting a result thereof to the buffer 153.

In operation 550, when the playback switch time is satisfied, the controller 154 may identify the second frame 630 requested for playback switch by using a second time stamp 640 distinguished from a first time 620 stamp of the first frame 610 and output the identified second frame 630 having the second time stamp 640.

Referring to FIG. 6, the controller 154 may identify one or more first frames 610 and one or more second frames 630 stored in the buffer 153 by using a time stamp. The frames corresponding to one stream may have consecutive time stamp values. That is, one or more first frames 610 corresponding to the first stream may have a series of consecutive time stamp values, and one or more second frames 630 corresponding to the second stream may have another series of consecutive time stamp values. Thus, the time stamp value of the first frame 610 corresponding to the first stream and the time stamp value of the second frame 630 corresponding to the second stream may be discontinuous. As such, by using the time stamp values of the frames, the controller 154 may identify or distinguish the second frame 630 corresponding to the second stream from the first frame 610 corresponding to the first stream. For example, referring to FIG. 6, the time stamp values of the first frames 610 corresponding to the first stream may increase as 0, 1, 2, 3, 4 . . . . Also, the time stamp values of the second frames 630 corresponding to the second stream may increase as 100, 101, 102, 103, 104 . . . . The first frames 610 and the second frames 630 may be mixed and stored in the buffer 153 of FIG. 6. As shown, the time stamp value of the first frame stored in the buffer 153 is 0 and the time stamp value of the next frame is 1 which are continuous. Meanwhile, the time stamp value of the subsequent stored frame is 100 which is a time stamp value discontinuous with the first frame or the second frame. Thus, the controller 154 may identify that the frames corresponding to different streams have discontinuous time stamp values, that is, may identify or distinguish the second frame having a second time stamp value from the first frame having a first time stamp value.

In general, the time stamp values of the frames corresponding to one stream may increase linearly. However, for example, even in the case of the frames corresponding to one stream, due to an issue such as a frame drop, a time stamp value may not increase constantly and a gap may occur. In this case, when a time stamp threshold value (e.g., predetermined value) is set and a time stamp value difference occurs within a set threshold value range (e.g., predetermined range set by default, by a manufacturer, by a user, etc.), the corresponding frame may be determined as a frame of the same source. For example, when the time stamp value increases as 1, 2, 3, 4, 5 . . . , the threshold value may be set to 5. Thus, when the frame subsequent to the frame having a time stamp value of 5 has a time stamp value of 7, since the time stamp value difference between the consecutive frames is <7−5=2> smaller than the threshold value of 5, the frame having a time stamp value of 7 may be determined as a frame corresponding to the same source. However, when the frame subsequent to the frame having a time stamp value of 5 has a time stamp value of 100, since the time stamp value difference therebetween is greater than the threshold value of 5, the frame having a time stamp value of 100 may be determined as a frame corresponding to a different source.

The controller 154 may identify or distinguish one or more second frames from one or more first frames and control the buffer 153 to output the identified one or more second frames to the first module 155. Under the control of the controller 154, the buffer 153 may output one or more second frames to the first module 155, for example, a scaler.

In operation 560, the controller 154 may control the buffer 153 to transmit one or more first frames to the second module 156.

In this case, the controller 154 may control the buffer 153 to transmit one or more first frames, e.g., the live content stream, to the second module 156, for example, the ACR module 130. This is to extract a fingerprint from the first stream even when the first stream is not played. In this case, the controller 154 may control the buffer 153 to transmit a predetermined number of first frames or may transmit the first frames according to a particular interval (e.g., sampling interval) to the ACR module 130 (e.g., every fifth first frame or every tenth first frame). Alternatively, the controller 154 may transmit each of the one or more first frames stored in the buffer 153 in a sequential manner until, by way of example, the playback switch end time has arrived.

According to an exemplary embodiment, when a playback switch end time has arrived, the controller 154 may end the stream playback switch and restore the playback to the original state. The playback switch end time may be determined, for example, by the length 652 of the replacement slot included in the playback switch event 650. The playback switch end time may be the time after time has passed by the length of the replacement slot.

According to an exemplary embodiment, in response to the playback switch end time, the controller 154 may identify or distinguish the one or more first frames from the one or more second frames stored in the buffer 153 by using the first time stamp value and control the buffer 153 to output the identified one or more first frames to the first module 155.

A method of identifying a frame by using a flag will now be described with reference to FIGS. 7 and 8.

Figure 7:
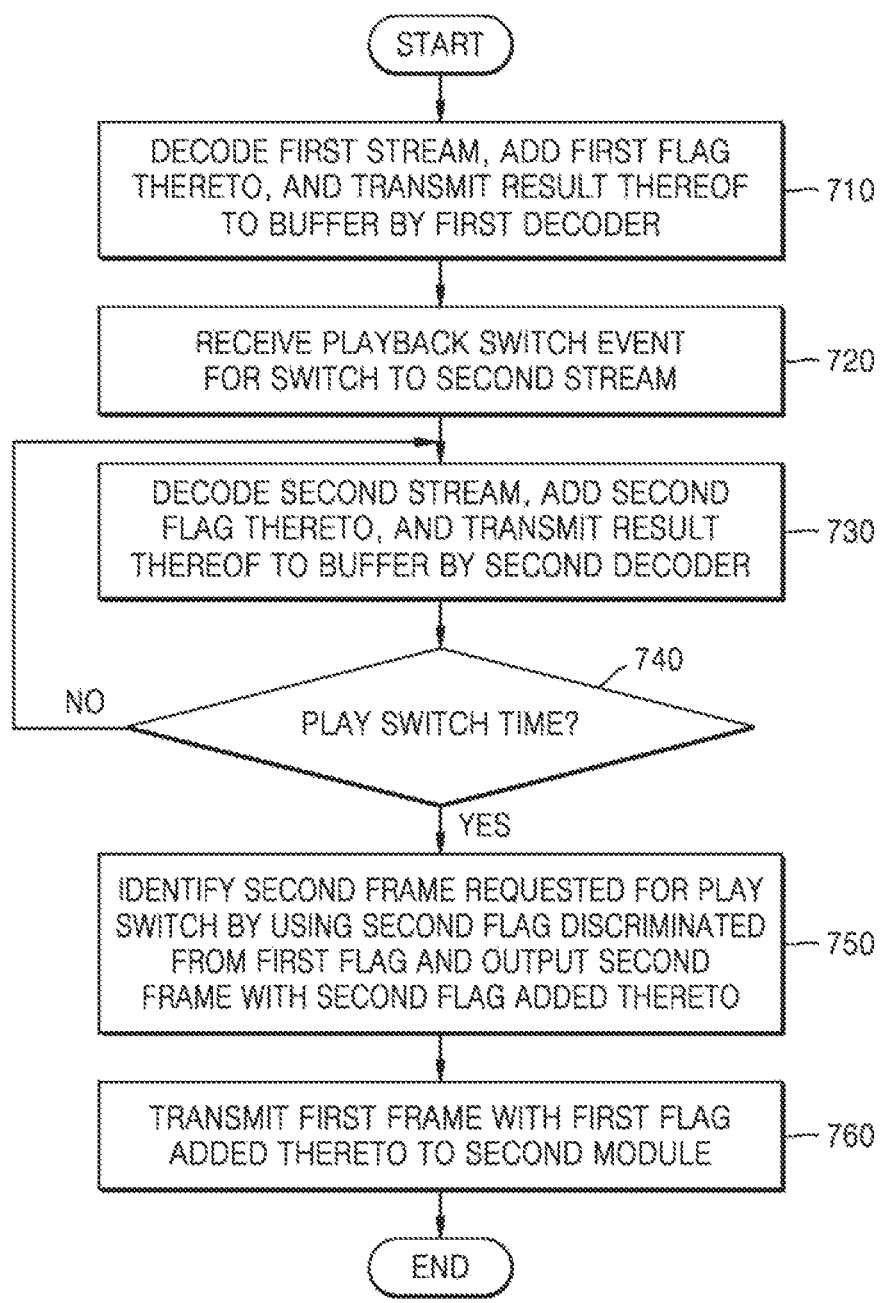
FIG. 7 is a flow diagram illustrating a process of a method of identifying a frame by using a flag according to an exemplary embodiment.

FIG. 7 is a flow diagram illustrating a process of a method of identifying a frame by using a flag according to an exemplary embodiment.

Figure 8:
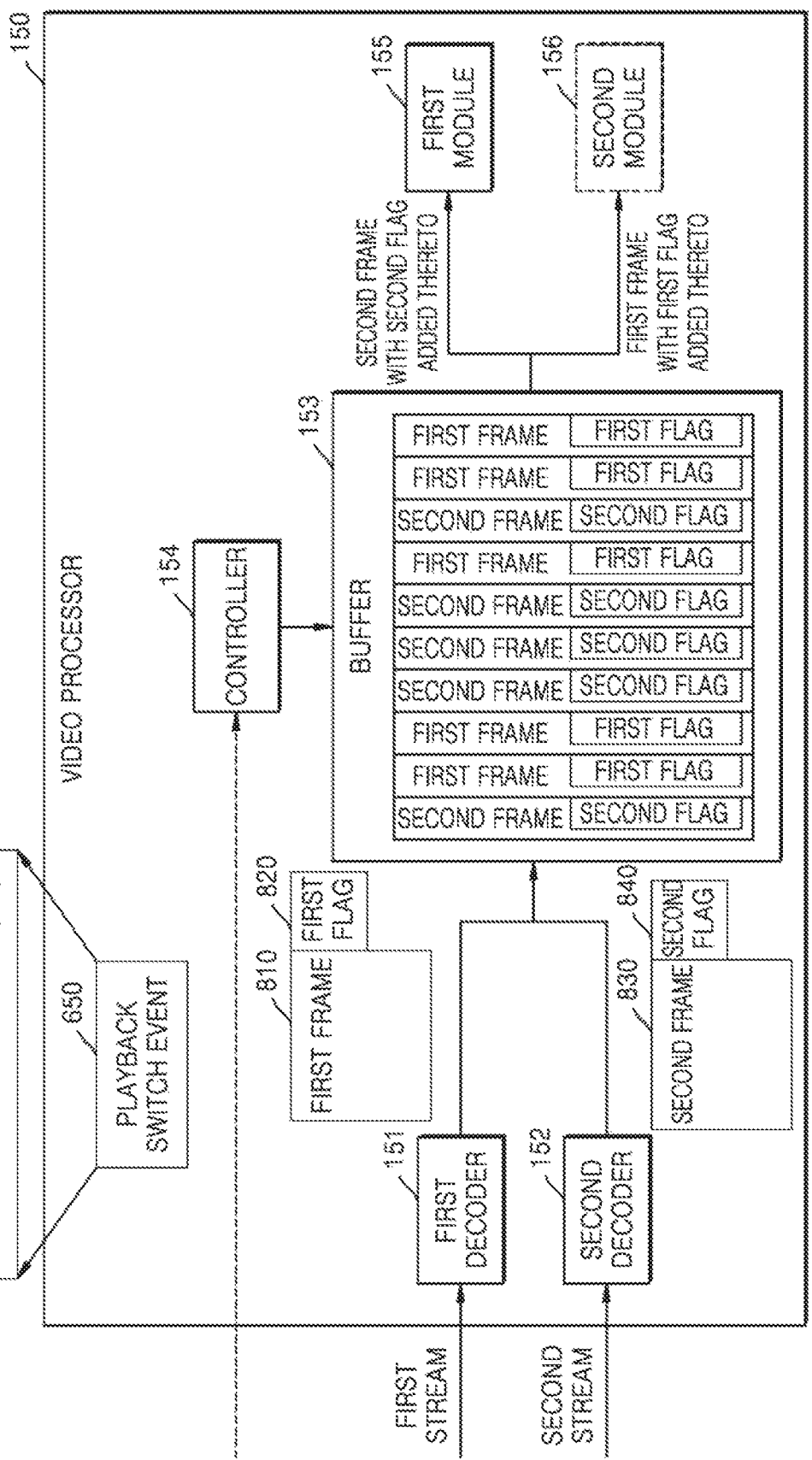
FIG. 8 is a reference diagram illustrating the method illustrated in FIG. 7.

FIG. 8 is a reference diagram illustrating the method illustrated in FIG. 7.

Referring to FIG. 7, in operation 710, the first decoder 151 may add a first flag to the first frame obtained by decoding the first stream and transmit a result thereof to the buffer 153. The first flag added to the first frame by the first decoder 151 may be a value (e.g., identifier of the corresponding stream or distinct bit values) that distinguishes the first frame corresponding to the first stream from the second frame corresponding to the second stream. That is, by giving different flags to the frames to be decoded, each of the first decoder 151 and the second decoder 152 may distinguish or identify which of the first decoder 151 and the second decoder 152 the stream is from.

Referring to FIG. 8, the first decoder 151 may receive and decode, for example, a live content stream as a first stream, add a first flag 820 to one or more first frames 810 corresponding to the decoded first stream, and transmit a result thereof to the buffer 153. The buffer 153 may store the one or more first frames 810 received from the first decoder 151 until it the one or more first frames 810 are output.

Until the execution of a playback switch event, one or more first frames 810 from the first decoder 151 may be output to the first module 155 such that the first stream (e.g., broadcast content) corresponding to the one or more first frames 810 may be displayed on a screen of the electronic apparatus 100.

In operation 720, the controller 154 may receive a playback switch event for requesting a switch from the first stream to the second stream.

The controller 154 may receive a playback switch event 650 for requesting a playback switch from the first stream to the second stream. The first stream and the second stream may be any streams from different sources. For example, in the following description, it is exemplified that the first stream is a live content stream and the second stream is multimedia content.

As an example, the controller 154 may receive the playback switch event 650 from the ACR module 130. The playback switch event 650 received from the ACR module 130 may be an event for requesting a playback switch from the live content stream to the multimedia content in order to display the replacement content in a replacement slot.

The playback switch event 650 may include at least one of a start point 651 of the replacement slot, a length 652 of the replacement slot, and a source 653 of the replacement slot, as described above with reference to FIG. 6.

In operation 730, the second decoder 152 may add a second flag 840 to one or more second frames 830 obtained by decoding the second stream and transmit a result thereof to the buffer 153.

According to a playback switch event, the second decoder 152 may receive and decode the second stream, that is, the multimedia content stream, add a second flag 840 to one or more second frames 830 corresponding to the decoded stream, and transmit a result thereof to the buffer 153. As described with reference to FIG. 6, the buffer 153 may store one or more first frames 810 from the first decoder 151 and one or more second frames 830 from the second decoder 152 in a mixed manner with or without a predetermined order.

In operation 740, the controller 154 may determine whether a playback switch time has arrived.

For example, by using the start point 651 of the replacement slot included in the playback switch event 650, the controller 154 may determine whether the playback switch time has arrived.

When the playback switch time has not arrived, the first decoder 151 and the second decoder 152 may continue to perform a process of decoding the first stream and transmitting a result thereof to the buffer 153 and decoding the second stream and transmitting a result thereof to the buffer 153.

In operation 750, when the playback switch time is satisfied, the controller 154 may identify the one or more second frames 830 requested for playback switch by using the second flag 840 distinguished from the first flag 820 of the one or more first frames 810 and output the identified one or more second frames 830 having the second flag 840 to an image output apparatus such as a display.

Referring to FIG. 8, the controller 154 may identify one or more second frames 830 with the second flag 840 added thereto from one or more first frames 810 with the first flag 820 added thereto and control the buffer 153 to output the identified one or more second frames 830 to the first module 155. Under the control of the controller 154, the buffer 153 may output one or more second frames 830 to the first module 155. That is, for example, the buffer 153 may output one or more second frames 830, e.g., multimedia content, to a scaler as an example of the first module 155.

In operation 760, the controller 154 may control the buffer 153 to transmit one or more first frames 810 to the second module 156.

For example, the controller 154 may control the buffer 153 to transmit one or more first frames 810, e.g., the live content stream, to the ACR module 130. This is to extract a fingerprint from the live content stream even when the live content stream is not played.

According to an exemplary embodiment, when a playback switch end time has arrived, the controller 154 may end the stream playback switch and restore the playback to the original state. The playback switch end time may be determined, for example, by the length 652 of the replacement slot included in the playback switch event 650. The playback switch end time may be the time after time has passed by the length of the replacement slot.

According to an exemplary embodiment, in response to the playback switch end time, the controller 154 may identify the one or more first frames 810 from the one or more second frames 830 stored in the buffer 153 by using the first flag 820 and control the buffer 153 to output the identified one or more first frames 810 to the first module 155.

Although the video frames of the replacement content have been described with reference to FIGS. 5 to 8, it is understood that the above-described exemplary embodiments may also be similarly applied to audio frames.

Additionally, while the above-described exemplary embodiments are with reference to content or digital fingerprinting as the applied ACR technology, it is understood that one or more other exemplary embodiments are not limited thereto and may be applicable to other ACR technologies, e.g., watermarking.

Methods of operating the electronic apparatuses according to one or more exemplary embodiments may be stored or implemented by instructions stored in computer-readable recording mediums by being implemented in the form of program commands that may be performed by various computer means and/or computing components. The computer-readable recording medium may include program commands, data files, and data structures either alone or in combination. The program commands recorded on the computer-readable recording medium may be those that are especially designed and configured in accordance with one or more exemplary embodiments, or may be those that are known and available to computer programmers skilled in the art. Examples of the computer-readable recording mediums may include magnetic recording mediums such as hard disks, floppy disks, and magnetic tapes, optical recording mediums such as CD-ROMs and DVDs, magneto-optical recording mediums such as floptical disks, and hardware apparatuses such as ROMs, RAMs, and flash memories that are especially configured to store and execute program commands. Examples of the program commands may include machine language codes that may be generated by a compiler, and high-level language codes that may be executed by a computer by using an interpreter.

As described above, a switch of content to be played may be efficiently performed in the electronic apparatuses and the methods of operating the same according to exemplary embodiments.

Although exemplary embodiments have been described above in detail, the scope of inventive concept(s) is not limited thereto and those of ordinary skill in the art will understand that various modifications and improvements may be made therein without departing from the spirit and scope of the inventive concept(s) as defined by the following claims.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments or combinable with features of other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An electronic apparatus comprising:
    a single buffer; and
    a controller configured to:
        control the single buffer to store one or more first frames corresponding to a first video stream,
        obtain information on a second video stream which is determined based on information on the first video stream, the second video stream being for performing a playback switch from the first video stream to the second video stream,
        obtain one or more second frames corresponding to the second video stream using the information on the second video stream,
        control the single buffer to store the one or more second frames corresponding to the second video stream while the one or more first frames corresponding to the first video stream are stored in the single buffer,
        in response to an event for the playback switch, identify the one or more second frames from the one or more first frames stored in the single buffer, which concurrently stores the one or more first frames and the one or more second frames, based on a time stamp value of the one or more second frames distinguished from a time stamp value of the one or more first frames, and/or based on a second flag added by the second decoder to the one or more second frames and distinguished from a first flag added by the first decoder to the one or more first frames, and
        control the single buffer to output the identified one or more second frames to display the identified one or more second frames,
    wherein the controller is configured to identify the one or more second frames from the one or more first frames stored in the single buffer, based on the time stamp value of the one or more second frames stored in the single buffer being discontinuous from the time stamp value of the one or more first frames stored in the single buffer, by determining that a source of a current frame is the same as a source of a previous frame when a difference between the time stamp value of the current frame and the time stamp value of the previous frame is less than a threshold, and by determining that the source of the current frame is different from the source of the previous frame when the difference between the time stamp value of the current frame and the time stamp value of the previous frame is greater than or equal to the threshold.

2. The electronic apparatus of claim 1, wherein the controller is configured to control the single buffer to output the one or more second frames at a playback switch time obtained based on the event for the playback switch.

3. The electronic apparatus of claim 2, wherein the playback switch time comprises a time at which a time stamp value of a first frame, among the one or more first frames corresponding to the first video stream, corresponds with time information obtained based on the event for the playback switch.

4. The electronic apparatus of claim 1, wherein the first video stream corresponds to digital television (TV) broadcasting content and the second video stream corresponds to multimedia content.

5. The electronic apparatus of claim 1, wherein the second video stream requested for playback switch according to the event for the playback switch comprises replacement content to be output in a replacement slot between currently-output content of the first stream and subsequent content of the first stream to be output after the currently-output content.

6. The electronic apparatus of claim 5, wherein the controller is configured to obtain, based on the event for the playback switch, information comprising at least one of a start point of the replacement slot, a length of the replacement slot, and source information of the replacement content to be output in the replacement slot.

7. The electronic apparatus of claim 5, wherein the controller is configured to control the single buffer to transmit the one or more first frames stored in the single buffer to an automatic content recognizer configured to extract a fingerprint from the one or more first frames.

8. The electronic apparatus of claim 1, further comprising a first decoder and a second decoder,
    wherein the first decoder is configured to provide the one or more first frames with the first flag added thereto to the single buffer and the second decoder is configured to provide the one or more second frames with the second flag added thereto to the single buffer.

9. The electronic apparatus of claim 1, wherein the controller is configured to control the single buffer to output the identified one or more first frames, in response to a playback switch end time obtained based on the event for the playback switch.

10. The electronic apparatus of claim 1, further comprising a first decoder and a second decoder,
wherein the controller is further configured to control the single buffer to store the one or more first frames decoded by the first decoder and the one or more second frames decoded by the second decoder.

11. The electronic apparatus of claim 1, wherein the controller is further configured to control the single buffer to output the identified one or more second frames to an image processing module to display the identified one or more second frames, and output the one or more first frames to an analyzing module to analyze the one or more first frames.

12. A method of operating an electronic apparatus, the method comprising:
controlling a single buffer to store one or more first frames corresponding to a first video stream,
obtain information on a second video stream which is determined based on information on the first video stream, the second video stream being for performing a playback switch from the first video stream to the second video stream,
obtain one or more second frames corresponding to the second video stream using the information on the second video stream,
controlling the single buffer to store the one or more second frames corresponding to the second video stream, while the one or more first frames corresponding to the first video stream are stored in the single buffer, and
in response to an event for playback switch, identifying the one or more second frames from the one or more first frames stored in the single buffer, which concurrently stores the one or more first frames and the one or more second frames, based on a time stamp value of the one or more second frames distinguished from a time stamp value of the one or more first frames, and/or based on a second flag added by the second decoder to the one or more second frames and distinguished from a first flag added by the first decoder to the one or more first frames, and
controlling the single buffer to output the identified one or more second frames to display the identified one or more second frames,
wherein identifying comprises identifying the one or more second frames from the one or more first frames stored in the single buffer, based on the time stamp value of the one or more second frames stored in the single buffer being discontinuous from the time stamp value of the one or more first frames stored in the single buffer, by determining that a source of a current frame is the same as a source of a previous frame when a difference between the time stamp value of the current frame and the time stamp value of the previous frame is less than a threshold, and by determining that the source of the current frame is different from the source of the previous frame when the difference between the time stamp value of the current frame and the time stamp value of the previous frame is greater than or equal to the threshold.

13. The method of claim 12, further comprising controlling the single buffer to output the one or more second frames at a playback switch time obtained based on the event for playback switch.

14. The method of claim 13, wherein the playback switch time comprises a time at which a time stamp value of a first frame, among the one or more first frames corresponding to the first video stream, corresponds with time information obtained based on the event for playback switch.

15. The method of claim 12, wherein the first video stream corresponds to digital television (TV) broadcasting content and the second video stream corresponds to multimedia content.

16. The method of claim 12, wherein the second video stream requested for playback switch according to the event for playback switch comprises replacement content to be output in a replacement slot between currently-output content of the first stream and subsequent content of the first stream to be output after the currently-output content.

17. The method of claim 16, further comprising obtaining, according to the event for playback switch, information comprising at least one of a start point of the replacement slot, a length of the replacement slot, and source information of the replacement content to be output in the replacement slot.

18. The method of claim 16, further comprising controlling the single buffer to transmit the one or more first frames stored in the single buffer to an automatic content recognizer configured to extract a fingerprint from the one or more first frames.

19. The method of claim 16, further comprising:
transmitting, to an external device, a fingerprint extracted from at least one first frame, among the one or more first frames; and
receiving, from the external device in response to the transmitted fingerprint, information corresponding to the event for playback switch and comprising at least one of a start point of the replacement slot, a length of the replacement slot, and source information of the replacement content to be output in the replacement slot.

20. A non-transitory computer-readable recording medium that stores a program that performs the method of claim 12 when executed by a computer.

21. The method of claim 12, further comprising providing, by a first decoder to the single buffer, the one or more first frames with the first flag added thereto and providing, by a second decoder to the single buffer, the one or more second frames with the second flag added thereto.

22. The method of claim 12, further comprising:
controlling the single buffer to output the identified one or more first frames, in response to a playback switch end time.

* * * * *